US007019989B2

(12) United States Patent
Kobayashi et al.

(10) Patent No.: US 7,019,989 B2
(45) Date of Patent: Mar. 28, 2006

(54) UNINTERRUPTIBLE POWER SUPPLY SYSTEM

(75) Inventors: Nobuyuki Kobayashi, Tokyo (JP); Hirokazu Tokuda, Tokyo (JP)

(73) Assignee: Fuji Electric Holdings Co., Ltd., (JP)

( * ) Notice: Subject to any disclaimer, the term of this patent is extended or adjusted under 35 U.S.C. 154(b) by 133 days.

(21) Appl. No.: 10/787,545

(22) Filed: Feb. 26, 2004

(65) Prior Publication Data

US 2004/0223347 A1 Nov. 11, 2004

(30) Foreign Application Priority Data

Mar. 31, 2003 (JP) ............................. 2003-095800

(51) Int. Cl.
*H02M 5/45* (2006.01)
*H02J 7/00* (2006.01)

(52) U.S. Cl. .......................................... 363/37; 307/66
(58) Field of Classification Search ................. 363/34, 363/37, 52, 53, 55, 56.01, 56.02; 307/46, 307/48, 60, 64, 66, 72–75, 82, 85, 86
See application file for complete search history.

(56) References Cited

U.S. PATENT DOCUMENTS

| 5,229,650 | A | * | 7/1993 | Kita et al. ............... 307/66 |
| 5,563,778 | A | * | 10/1996 | Oh ........................ 363/37 |
| 5,631,814 | A | * | 5/1997 | Zak ....................... 363/37 |
| 5,771,161 | A | * | 6/1998 | Jackson et al. .......... 363/40 |
| 5,811,960 | A | * | 9/1998 | Van Sickle et al. ....... 322/4 |
| 6,556,459 | B1 | * | 4/2003 | Okui et al. .............. 363/37 |

FOREIGN PATENT DOCUMENTS

| EP | 1 244 193 A2 | 9/2002 |
| JP | 2001-128390 A | 5/2001 |
| JP | 2002-199620 A | 7/2002 |

OTHER PUBLICATIONS

U.S. Appl. No. 10/777,786, filed Feb. 12, 2004; Yasuhiro Okuma; "Electric Power Converting Device"; pp. 1-33; Figs. 1-11B.
Hidetaka Kidoguchi: "Applied trend and example of mini-UPS". OHM additional volume (Power Electronic Guidebook) p. 82-87, Nov. 1999.
Relevant portion of European Search Report dated Jul. 21, 2005 for corresponding application EP 04 00 4348.

* cited by examiner

*Primary Examiner*—Matthew V. Nguyen
(74) *Attorney, Agent, or Firm*—Rossi, Kimms & McDowell, LLP (57) ABSTRACT

An uninterruptible power supply system prevents an output voltage from dropping due to an operation delay of a relay for isolating an alternating-current power source side and avoids an unexpected current flowing between the alternating-current power source side and the uninterruptible power supply system side. When short circuit occurs, a parallel converter connected in parallel to input terminals connected to an alternating-current power source is made to operate so that the output voltage thereof becomes "0" or the input voltage Vin and a series inverter connected in series between an input relay and one of output terminals is made to carry out a compensating operation with a smoothing capacitor taken as a power source so that a value of an applied voltage to the output terminals becomes an output voltage command value Vout*. This makes the output voltage of the parallel converter become "0" or Vin to produce no electric potential difference between the alternating-current power source side and the output side of the parallel converter. Therefore, no current flows between the alternating-current power source side and the parallel converter, and a value of an applied voltage to the output terminals is to be continuously maintained at the output voltage command value Vout* by the series inverter.

12 Claims, 3 Drawing Sheets

UNINTERRUPTIBLE POWER SUPPLY SYSTEM

BACKGROUND

A conventional uninterruptible power supply system and an uninterruptible power supply system according to the present invention for a single phase circuit share some common elements. In this respect, the conventional power supply system will be described in reference to FIGS. 1 and 2. The primary difference between the two is in the control circuit 20, 20a.

Figure 1:
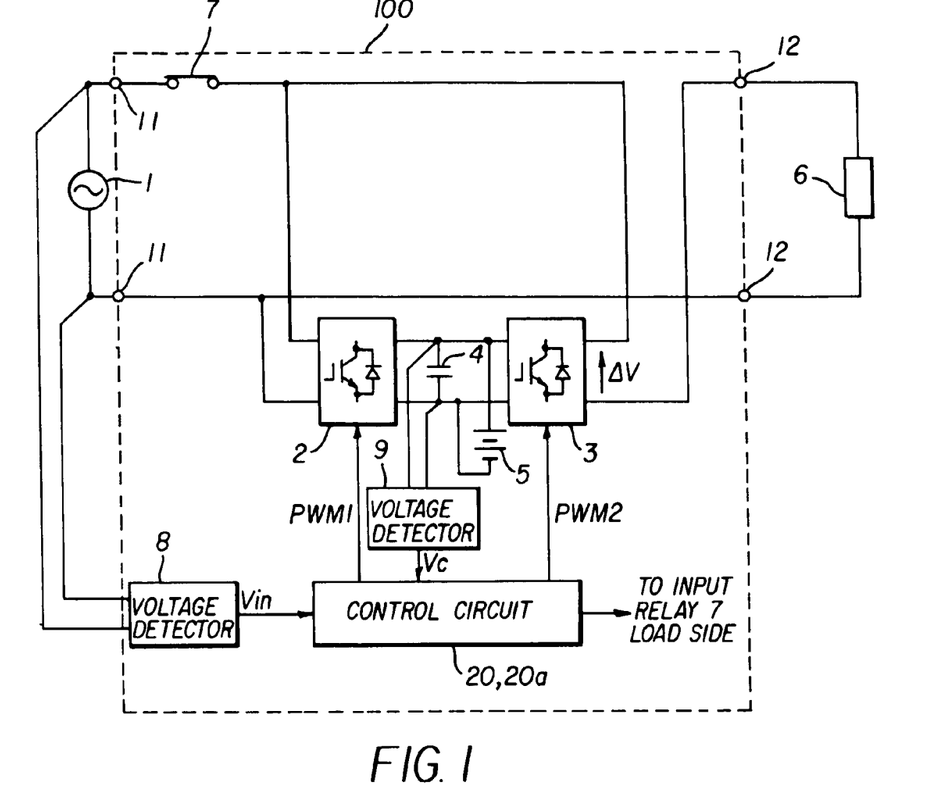
FIG. 1 schematically illustrates an uninterruptible power supply system according to the present invention.

The conventional power supply system also includes an input relay positioned between input terminals (input end) 11, to which an alternating-current power source 1 is input, and output terminals (output end) 12, to which a load 6 is connected. By placing the input relay 7 in a cutoff (non-conducting) state when an abnormality occurs in the alternating-current power source 1, the alternating-current power source 1 is isolated from the uninterruptible power supply system. A parallel converter is connected in parallel to the input terminals 11 through the input relay 7 and is capable of carrying out a rectifier operation and an inverter operation. Moreover, a series inverter 3 is connected in series between the input relay 7 and one of the output terminals 12 to carry out an inverter operation. Between the parallel converter 2 and series converter 3, a smoothing capacitor 4 and an energy storing unit 5, such as a battery are connected in parallel thereto.

Figure 2:
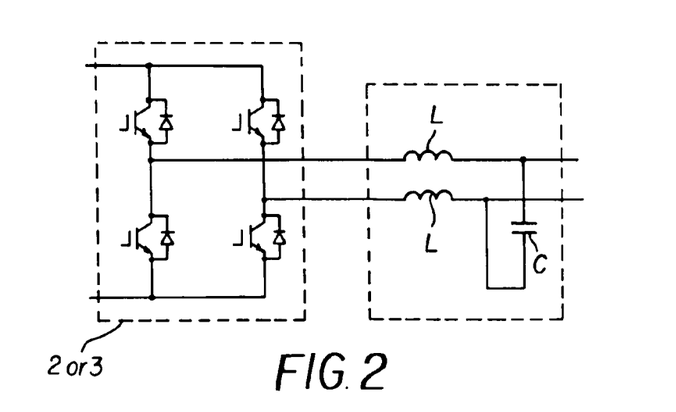
FIG. 2 schematically illustrates a circuit arrangement of the parallel converter section or the series inverter section of FIG. 1.

According to the conventional power supply system a control circuit (not illustrated) controls the parallel converter 2 and the series inverter 3. The conventional control circuit, based on an alternating-current power source voltage Vin, supplied from the alternating-current power source 1 and detected by a voltage detector 8, and a terminal voltage Vc of the smoothing capacitor 4 detected by a voltage detector 9, controls the output voltage to the load 6 to become a specified voltage. FIG. 2 illustrates a parallel converter 2 and a series inverter 3 arranged with a full bridge circuit using semiconductor switches (i.e., transistors). The ON-OFF operations of these semiconductor switches are, with respect to the parallel converter 2, carried out based on a gate signal PWM 1 output from the control circuit. Moreover, with respect to the series inverter 3, the operations are carried out based on a gate signal PWM 2 output from the control circuit. On the output side of the parallel converter 2 or the series inverter 3, as shown in FIG. 2, a filter, which is constituted with reactors L and a capacitor C, can be disposed.

When the voltage detector 8 detects that the alternating-current power source voltage Vin of the alternating-current power source 1 is within a permissible range, the input relay 7 is at the ON-state, and the parallel converter 2 operates to charge and discharge the smoothing capacitor 4 based on the terminal voltage Vc of the smoothing capacitor 4 detected by the voltage detector 9 so that the voltage Vc becomes the specified voltage. This converts the alternating-current power of the alternating-current power source 1 to the direct-current power so that the terminal voltage Vc of the smoothing capacitor 4 is maintained at the specified voltage. In addition, the series inverter 3 is operated to output a compensating voltage $\Delta V$ to compensate for any excess or deficiency in the alternating-current power source 1 so that a voltage applied to the load 6 becomes the specified voltage. This converts the direct-current power from the smoothing capacitor 4 to the alternating-current power with the applied voltage to the load 6 maintained at the specified voltage.

When the alternating-current power source voltage Vin from the alternating-current power source 1 is outside the permissible range, it is decided that an abnormality has occurred on the alternating-current power source side, the input relay 7 is switched into a cutoff state and the operation of the series inverter 3 is stopped, while the parallel converter 2 is made to perform an inverter operation to convert the direct-current power of the energy storing unit 5 to a specified alternating-current power, which is supplied to the load 6. This makes the applied voltage to the load 6 to be maintained at the specified voltage even when the alternating-current power source side is isolated. See for example, JP-A-2002-199620.

In the conventional uninterruptible power supply system, however, when the input relay 7 is formed with mechanical contacts, an operation delay of several milliseconds to ten and some odd milliseconds occurs in the input relay 7 from the inception of an ON-OFF command to an actual completion of operation. Therefore, from the occurrence of the power failure to the isolation of the alternating-current power source side from the uninterruptible power supply system 100, during which the power failure is detected, while the input relay 7 is controlled to be actually brought to the cutoff state, the load side of the input relay 7 can experience power failure or drop out. In this state, where the power supply to the load is continued with the operation of the series inverter 3 stopped and the parallel converter 2 made to carryout an inverter operation in response to the detection of power failure, when the alternating-current power source voltage Vin is outside the permissible range by occurrence of short circuit on the alternating-power source side, for example, the alternating-power source side in the short circuit state brings the parallel converter 2 connected to the power source in parallel, also into the short circuit state. Therefore, it makes it impossible to maintain the voltage applied to the load 6 at the specified voltage.

Moreover, an operation of the parallel converter 2 for maintaining the specified voltage produces an electric potential difference between the power source voltage after the power failure and the output voltage of the parallel converter 2. This, in some cases, causes current to flow between the alternating-current power source 1 and the parallel converter 2. In particular, at a short circuit failure occurred at the short circuit of the alternating-current power source 1, an unexpected short circuit current can flow in some cases, interfering with the whole uninterruptible power supply system. Furthermore, when the alternating-current power source side is brought into an open circuit state by the power failure, there is also a problem in which, although the alternating-current power source side is essentially in a state without power source, a voltage is supplied thereto from the uninterruptible power supply system.

Accordingly, there remains a need to remove the above-described problems associated with a conventional system so that an uninterruptible power supply system can avoid dropout in an output voltage when the alternating-current power source side is isolated. The present invention addresses this need.

SUMMARY OF THE INVENTION

The present invention relates to an uninterruptible power supply system. The present system can supply stabilized AC power to the load while having the ability supply power from an energy storing unit during power failure at the supply side. More specifically, the present system can supply stabilized power to the load while carrying out switching operation from a normal operation to an operation at power failure.

The uninterruptible power supply system includes a circuit cutoff unit, a parallel power converting unit, a series power converting unit, and an electricity storing unit. The cutoff unit is inserted between an input end to which alternating-current power is supplied and an output end connectable to a load, for isolating the alternating-current power supplying side. The parallel power converting unit is connected between the cutoff unit and the output end in parallel to the input end. The series power converting unit is inserted in series between a parallel connected point of the parallel power converting unit and the output end. The electricity storing unit is connected so that it permits electric power to be interchanged between the parallel power converting unit and series power converting unit.

According to one aspect of the present invention, the power system further includes a power failure detecting unit that detects a power failure. In another aspect of the present invention, the power system further includes a control circuit that includes the power failure detecting unit; the control circuit is connected to the parallel power converting unit and the series power converting unit for controlling the same.

When the supply of the alternating-current power is within a normal predetermined range, the series power converting unit compensates, or the control circuit controls the series power converting unit to compensate, the supply of the alternating-current power with the electricity storing unit taken as an electric power source so that a value of an alternating-current power output at the output end becomes a specified value of output, and the parallel power converting unit charges and discharges, or the control circuit unit controls the parallel power converting unit to charge and discharge, the electricity storing unit so that an amount of stored electricity in the electricity storing unit becomes a specified amount.

When the power failure detecting unit detects a power failure, the cutoff unit isolates, or the control circuit controls the cutoff unit to isolate, the alternating-current power supplying side, and the series power converting unit operates, or controls the series power converting unit to operate, with the electricity storing unit taken as a power source so that the value of the alternating-current power at the output end becomes the specified value of output.

More specifically, when the power failure detecting unit detects a power failure, the series power converting unit outputs, or the control circuit controls the series power converting unit to output, the whole voltage of the alternating-current output at the output end so that the value of the alternating-current power at the output end becomes the specified value of output.

Alternatively, the power supply system can include an alternating-current voltage detecting unit that detects a voltage of the supplied alternating-current power. When the power failure detecting unit detects a power failure, the parallel power converting unit operates, or the control circuit controls the parallel power converting unit, so that a voltage of the parallel connected point side becomes the alternating-current power source voltage detected by the alternating-current voltage detecting unit, and the series power converting unit compensates, or the control circuit controls the series power converting unit to compensate, an output voltage of the parallel power converting unit so that the value of the alternating-current output at the output end becomes the specified value of output.

The power supply system or the control circuit can further include a control for preventing an electric potential difference produced between the input end and the output of the parallel power converting unit during a power failure.

In one embodiment, wherein when the power failure detecting unit detects a power failure, the parallel power converting unit outputs, or the control circuit controls the parallel power converting unit to output, a zero voltage to the output end and to a cutoff unit side connected to the output end so that no electric potential difference is produced between the input end and the output of the parallel power converting unit.

In another embodiment, when the power failure detecting unit detects a power failure, the parallel power converting unit outputs, or the control circuit controls the parallel power converting unit to output, a voltage equivalent to the input voltage of the input end to the output end and to the cutoff unit side connected to the output end so that no electric potential difference is produced between the input end and the output of the parallel power converting unit.

DETAILED DESCRIPTION

The present uninterruptible power supply system 100 is illustrated in FIGS. 1 and 2, which is substantially similar to the conventional system described previously except for the control circuit 20, 20a, which will be described below.

Figure 3:
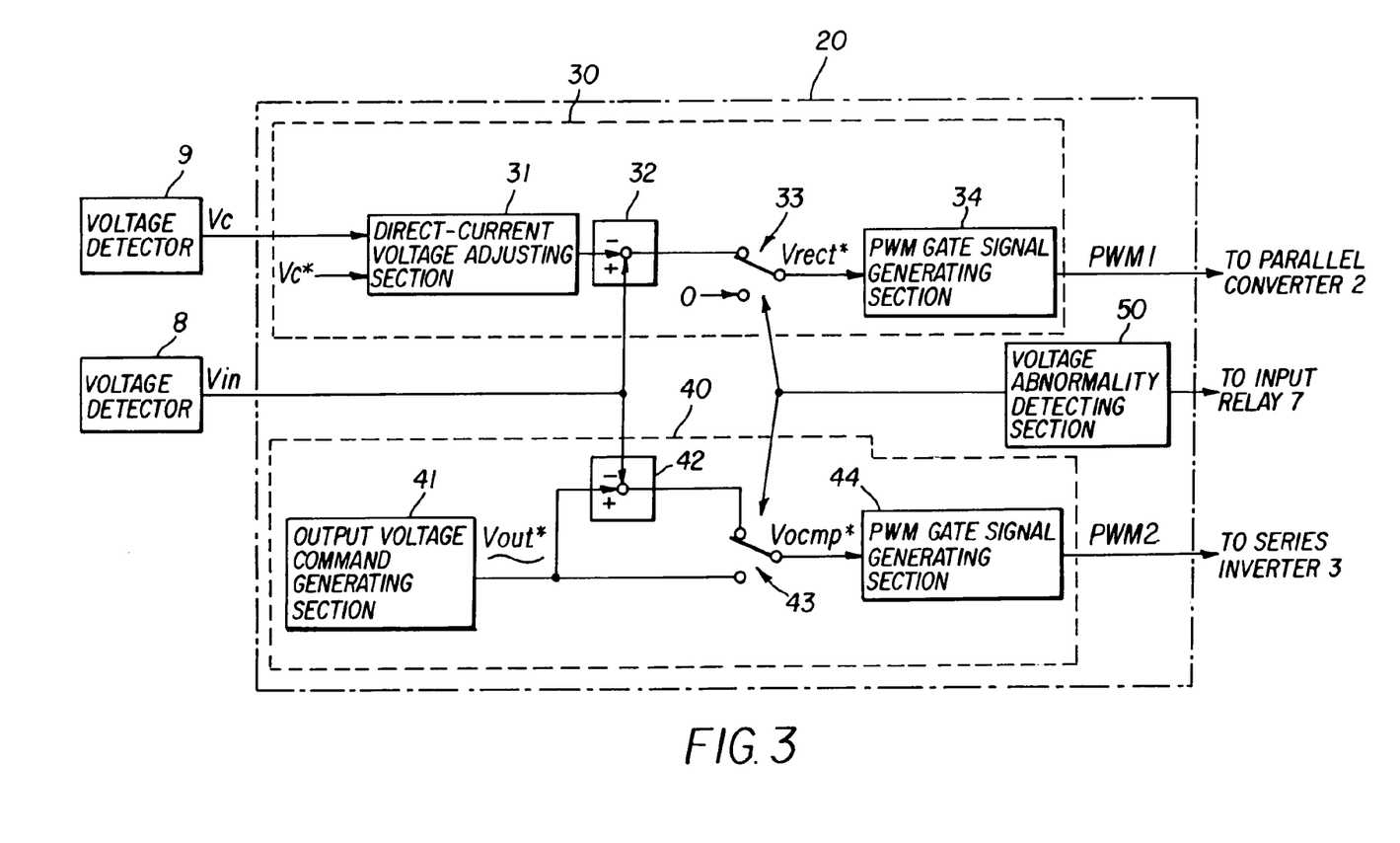
FIG. 3 schematically illustrates a first embodiment of the control circuit of FIG. 1.

Referring to FIG. 3, which illustrates a first embodiment of the control circuit 20 according to the present invention, the control circuit 20 includes a parallel converter control section 30 for carrying out control of the parallel converter 2, a series inverter control circuit 40 for carrying out control of the series inverter 3, and a voltage abnormality detecting section 50. The parallel converter control section 30 includes a direct-current voltage adjusting section 31 that carries out adjusting arithmetic operation so that the value of the terminal voltage Vc of the smoothing capacitor 4 detected by the voltage detector 9 and a predetermined specified value Vc* equal to each other, a subtracter 32 that subtracts a value of an adjusting voltage calculated at the direct-current voltage adjusting section 31 from the value of the alternating-current power source voltage Vin detected by the voltage detector 8, a changeover switch 33 that selects either the subtracted value calculated at the subtracter 32 or a specified value "0" to provide it as an output voltage command value Vrect* for the parallel converter 2, and a PWM gate signal generating section 34 that carries out PWM control based on the parallel converter output voltage command value Vrect* set by the changeover switch to produce the gate signal PWM 1 for making the semiconductor switch forming the parallel converter 2 perform ON-OFF operation.

The series inverter control section 40 includes an output voltage command generating section 41 that sets an output voltage command value Vout* of the uninterruptible power supply system 100 according to an alternating-current voltage to be applied to the load 6, a subtracter 42 that subtracts the value of the alternating-current power source voltage Vin detected by the voltage detector 8 from the output voltage command value Vout* set at the output voltage command generating section 41, a changeover switch 43 that selects either the subtracted value calculated at the subtracter 42 or the output voltage command value Vout* set at the output voltage command generating section 41 for a compensating voltage command value Vocmp*, and a PWM gate signal generating section 44 that carries out PWM control on the basis of the compensating voltage command value Vocmp* selected by the changeover switch 43 to produce the gate signal PWM 2 for making the semiconductor switches forming the series inverter 3 perform ON-OFF operation.

Moreover, the voltage abnormality detecting section 50 decides whether or not the alternating-current power source voltage Vin detected by the voltage detector 8 is within a predetermined permissible range in which the alternating-current power source voltage Vin can be regarded as operating normally. When the voltage is within the predetermined permissible range, the input relay 7 is controlled to operate in the ON state, while the changeover switch 33 in the parallel converter control section 30 is controlled so as to select the output of the subtracter 32, and the changeover switch 43 in the series inverter control section 40 is controlled so as to select the output of the subtracter 42.

When the alternating-current power source voltage Vin is determined to be outside the predetermined permissible range, the input relay 7 is controlled to be in the cutoff state, while the changeover switch 33 in the parallel converter control section 30 is controlled to select the specified value "0", and the changeover switch 43 in the series inverter control section 40 is switched to select the output voltage command value Vout* from the output voltage command generating section 41.

In operation, when the alternating-current power source voltage Vin is within the permissible range, in the voltage abnormality detecting section 50, the input relay 7 is controlled to be in the state of conduction or ON state, while the changeover switches 33 and 43 are controlled so that the output of the subtracter 32 is selected by the changeover switch 33, and the output of the subtracter 42 is selected by the changeover switch 43. This makes, in the parallel converter control section 30, a result of an adjusting calculation at the direct-current voltage adjusting section 31, which is performed for making the value of the terminal voltage Vc of the smoothing capacitor 4 equal to the specified value Vc* thereof, is subtracted from the value of the alternating-current power source voltage Vin. The result of the subtraction is set as the output voltage command value Vrect* of the parallel converter 2, based on which the gate signal PWM1 is produced.

In the series inverter control section 40, a value, for which the value of the alternating-current power source voltage Vin is subtracted from the output voltage command value Vout* set at the output voltage command generating section 41, is set as the compensating voltage command value Vocmp*, based on which the gate signal PWM2 is produced.

Therefore, by the parallel converter 2 operating so that the value of the terminal voltage Vc of the smoothing capacitor 4 equals to the specified value Vc* thereof, the value of the terminal voltage Vc of the smoothing capacitor 4 is maintained at the specified value Vc* thereof. Moreover, by the series inverter 3 operating to output the compensating voltage command value Vocmp*, the value of the alternating-current power source voltage Vin is compensated. As a result, to the output terminals 12, a voltage with a value equivalent to the output voltage command value Vout* is to be applied, which results in the applied voltage to the load 6 maintained at the output voltage command value Vout*.

Drop in the alternating-current power source voltage Vin from this state by occurrence of short circuit or power failure on the alternating-current power source 1 side is detected by the voltage abnormality detecting section 50 when the alternating-current power source voltage Vin is outside the permissible range, by which the input relay 7 is switched to a cutoff state, while control is carried out so that the specified value "0" is selected by the changeover switch 33, and control is carried out so that the output voltage command value Vout* is selected by the changeover switch 43.

This makes the parallel converter control section 30 operate the parallel converter 2 so that the value of the output voltage thereof becomes the specified value "0." Moreover, the series inverter control section 40 makes the series inverter 3 perform an inverter operation so that the value of the output voltage thereof becomes the output voltage command value Vout*. That is, direct-current electric power in the energy storing unit 5 is converted to alternating-current electric power to be applied to the output terminals 12. Therefore, to the load 6, a voltage with the output voltage command value Vout* is continuously applied.

Here, on detecting drop in the alternating-current power source voltage Vin, the input relay 7 is controlled to operate in a cutoff state. However, when the input relay 7 is formed with mechanical contacts, an operation delay occurs until the alternating-current power source 1 side is isolated from the power supply side. When the operation of the input relay 7 is not completed, because of occurrence of short circuit, the alternating-current side of the parallel converter 2 is also brought into the state of being short circuited. Here, however, the operation is made so that the output voltage of the parallel converter 2 becomes "0" so that the voltage on the side of the input relay 7 connected to the load 6 becomes "0." Thus, no electric potential difference is produced between the alternating-current power source 1 side and the output side of the parallel converter 2. Therefore, no unexpected short circuit current flows between the parallel converter 2 and the alternating-current power source 1. This makes it possible to avoid adverse effect due to this exerted on the uninterruptible power supply system itself or equipment connected to the same power system, and improve the reliability thereof.

Figure 4:
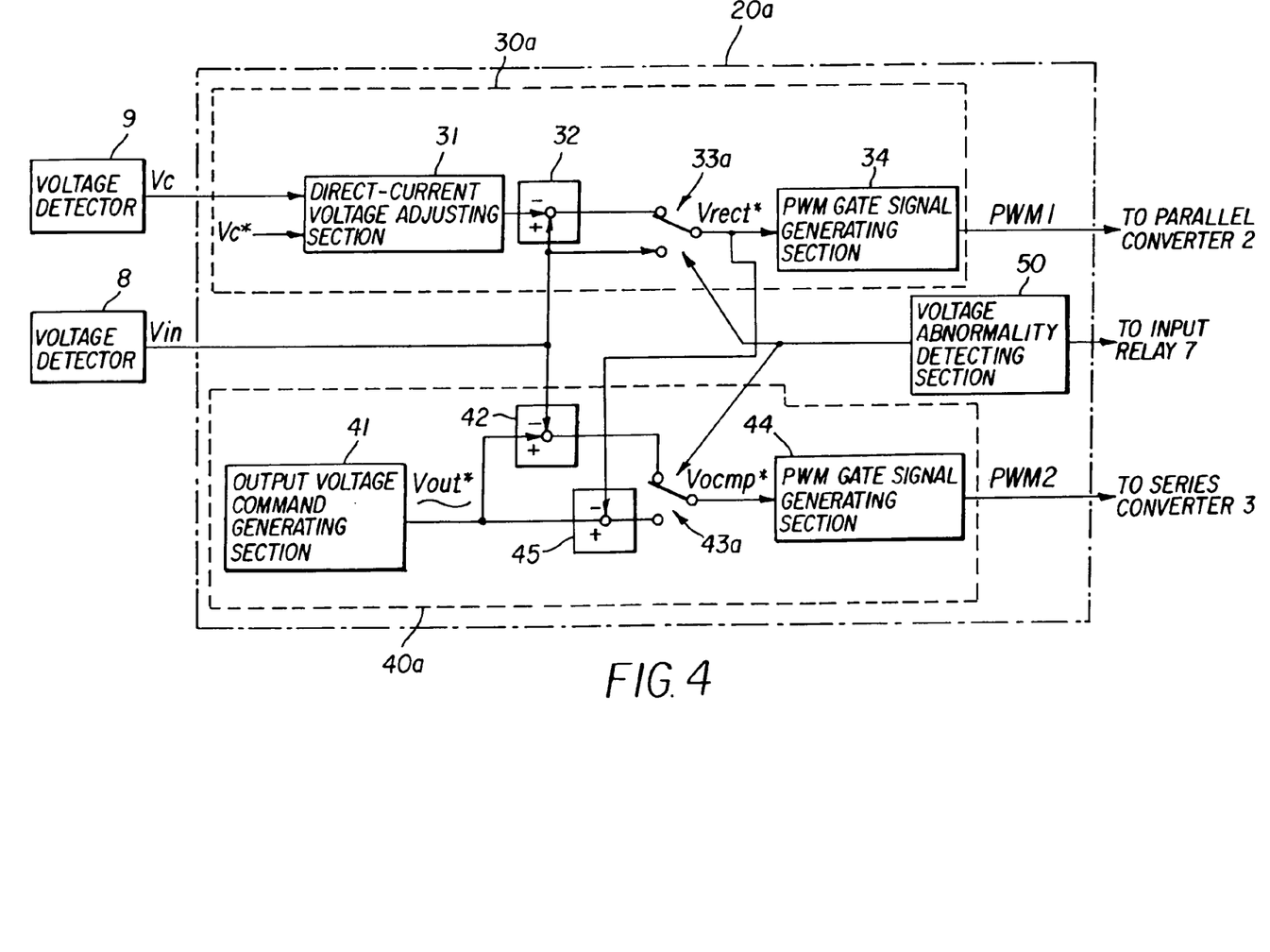
FIG. 4 schematically illustrates a second embodiment of the control circuit of FIG. 1.

Referring to FIG. 4, which discloses a second embodiment of the control circuit 20a according to the present invention, in the second embodiment the parallel converter control section 30a, similar the first embodiment, uses the direct-current voltage adjusting section 31 to carry out the adjusting arithmetic operation so that the value of the terminal voltage Vc of the smoothing capacitor 4 detected by the voltage detector 9 and a specified value Vc* thereof equal to each other. In the subtracter 32, the value of an adjusting voltage calculated out at the direct-current voltage adjusting section 31 is subtracted from the value of the alternating-current power source voltage Vin. Either the subtracted value calculated at the subtracter 32 or the value of the alternating-current power source voltage Vin detected by the voltage detector 8 is selected by a changeover switch 33a. The selected one is set as an output voltage command value Vrect* for the parallel converter 2. Furthermore, based on the parallel converter output voltage command value Vrect* thus set by the changeover switch 33a, PWM control is carried out at the PWM gate signal generating section 34, by which the gate signal PWM 1 is produced for making the semiconductor switch forming the parallel converter 2 perform an ON-OFF operation.

In the series inverter control section 40a, like in the first embodiment, the value of the alternating-current power source voltage Vin detected by the voltage detector 8 is subtracted by the subtracter 42 from the output voltage command value Vout* set at the output voltage command generating section 41. At the subtracter 45, the output voltage command value Vrect* for the parallel converter 2 selected by the changeover switch 33a in the parallel converter control section 30a is subtracted from the output voltage command value Vout* set at the output voltage command generating section 41. Furthermore, either the subtracted value calculated out at the subtracter 42 or the subtracted value calculated out at the subtracter 45 is selected by the changeover switch 43a to provide the selected one as being the compensating voltage command value Vocmp*. Based on the compensating voltage command value Vocmp*, PWM control is carried out at the PWM gate signal generating section 44 to produce the gate signal PWM 2 for making the semiconductor switches forming the series inverter 3 perform ON-OFF operation.

In the voltage abnormality detecting section 50, when the alternating-current power source voltage Vin is within a permissible range, the input relay 7 is controlled to be in the state of conduction, while by the changeover switch 33a, the value of the output of the subtracter 32 is set as the output voltage command value Vrect* for the parallel converter 2, and by the changeover switch 43a, the value of the output of the subtracter 42 is set as the compensating voltage command value Vocmp*. When the alternating-current power source voltage Vin is outside the permissible range, the input relay 7 is controlled to be in the state of cutoff. Furthermore, by the changeover switch 33a, the value of the alternating-current power source voltage Vin is set as the output voltage command value Vrect* for the parallel converter 2. Moreover, by the changeover switch 43a, the value of the output of the subtracter 45 is set as the compensating voltage command value Vocmp*.

In operation, when the alternating-current power source voltage Vin is within the permissible range, the input relay 7 is controlled to be in the state of conduction, while the output of the subtracter 32 is selected by the changeover switch 33a, and the output of the subtracter 42 is selected by the changeover switch 43a. Therefore, the uninterruptible power supply system 100 operates similarly to the system incorporating the control circuit of the first embodiment.

When the alternating-current power source voltage Vin is outside the permissible range by drop in the output of the alternating-current power source 1 for any reason, the input relay 7 is controlled to be in the cutoff state. Moreover, by the changeover switch 33a, the value of the alternating-current power source voltage Vin is selected as the output voltage command value Vrect* for the parallel converter 2, and, by the changeover switch 43a, the value of the output of the subtracter 45 is set as the compensating voltage command value Vocmp*. Therefore, in the parallel converter 2, an inverter operation is to be performed so that the value of the output voltage thereof becomes the value of the alternating-current power source voltage Vin.

Here, when the input relay 7 is actually not yet in the cutoff state due to the operation delay thereof, a residual voltage of the alternating-current power source voltage Vin appears on the load side of the input relay 7. Therefore, the parallel converter 2 operates so that the output voltage thereof becomes the residual voltage of the alternating-current power source voltage Vin. Thus, no electric potential difference is produced between the output voltage of the parallel converter 2 and the alternating-current power source voltage Vin. Therefore, the current flowing between the alternating-current power source 1 and the uninterruptible power supply system 100 becomes zero. Hence, even when the input relay 7 is not actually in the cutoff state, it is possible to make the state thereof equivalent to the state where the alternating-current power source 1 and the uninterruptible power supply system 100 are fully isolated.

In particular, when short circuit occurs, an unexpected short current flows through the short circuited part. However, the parallel converter 2 operates so that no electric potential is produced between the alternating-current power source voltage Vin and the output voltage of the parallel converter 2. Therefore, it is possible to avoid adverse effect due to the flow of unexpected short circuit current exerted on the uninterruptible power supply system 100 itself or equipment connected thereto.

The series inverter 3 operates with a value for which the output voltage command value Vrect* for the parallel converter 2 is subtracted from the output voltage command value Vout*. That is, a value for which the value of the alternating-current power source voltage Vin is subtracted therefrom, taken as the compensating voltage command value Vocmp*. Namely, the series inverter 3 carries out a compensating operation so that the value of the output of the system becomes the output voltage command value Vout* to the output of the parallel inverter 2. The series inverter 3, when the value of the alternating-current power source voltage Vin is within the permissible range, carries out a compensating operation to the alternating-current power source voltage Vin so that the value of the output voltage of the system is maintained at the output voltage command value Vout*, while, when the alternating-current power source voltage Vin is outside the permissible range, carries out a compensating operation to the parallel converter 2 so that the value of the output voltage of the system is maintained at the output voltage command value Vout*.

Even when operation delay occurs, until the cutoff of the input relay 7 is completed, the value of the applied voltage to the load 6 can be maintained at the output voltage command value Vout* without any drop in the output voltage of the system. Moreover, realization of this is possible without being affected by the residual voltage of the alternating-current power source voltage Vin. Furthermore, it is possible to prevent generation of an unexpected current due to the alternating-current power source voltage Vin becoming outside the permissible range. In addition, the output voltages of the parallel converter 2 and the series converter 3 are provided so that the output voltage command value Vout* is compensated thereby. Therefore, even though the operation of the input relay 7 is completed and the alternating-current power source 1 is isolated from the uninterruptible power supply system, the system is not affected at all.

In the second embodiment, the alternating-current power source voltage Vin is actually detected and the parallel inverter 2 is to be controlled so that a voltage equivalent to the alternating-current power source voltage Vin is output. Thus, the unexpected current can be surely prevented from flowing.

Although the first and second embodiments were referenced with the parallel converter 2 or the series inverter 3 formed with a full bridge circuit, including switching elements and diodes connected in inverse-parallel to the elements, the parallel converter 2 or the series inverter 3 is not limited to the full bridge circuit, but other configuration, such as a half bridge circuit, for example, can be applied.

Moreover, although explanations were made for a single-phase uninterruptible power supply system, the present invention is not limited thereto, but can be of course applied even to an uninterruptible power supply system of other than a single-phase type, such as a three-phase uninterruptible power supply system.

The input relay 7 corresponds to the cutting off unit, the parallel converter 2 to the parallel power converting unit, the series inverter 3 to the series power converting unit, the smoothing capacitor 4 and the energy storing unit 5 to the electricity storing unit, the voltage detector 8 to the alternating-current voltage detecting unit, and the voltage abnormality detecting section 50 to the short circuit detecting unit and the power failure detecting unit.

As explained above, by the uninterruptible power supply system according to the present invention, when a short circuit power failure occurs, for example, on the alternating-current supplying side, the alternating-current supplying side is isolated from the uninterruptible power supply system side by the cutoff unit, while the parallel power converting unit is operated to make the voltage level of the parallel connected point side become a short circuit voltage level set beforehand, and the series power converting unit is operated to make the value of the alternating-current output at the output end become a specified output value. Therefore, even when an operation delay occurs, until isolation of the alternating-current power supply side is completed, the value of the alternating-current output at the output end can be maintained at the specified value.

When the supplied alternating-current power is sound, the series power converting unit operates to compensate the supplied alternating-current power with the electricity storing unit taken as an electric power source so that a value of an alternating-current power output at the output end becomes a specified value of output. Moreover, the parallel power converting unit carries out charging and discharging of the electricity storing unit so that an amount of stored electricity in the electricity storing unit becomes a specified amount. Therefore, when the supplied alternating-current power is sound, the value of the alternating-current power output at the output end is maintained at the specified value of output.

When a short circuit failure, for example, occurs on the alternating-current power supplying side and is detected by the power failure detecting unit, the alternating-current power supplying side is isolated from the uninterruptible power supply system side by the cutoff unit. Here, during the time from occurrence of the short circuit on the alternating-current power supplying side through the operation of the cutting off unit in response thereto to completion of isolation of the alternating-current power supplying side, the alternating-current side of the parallel power converting unit is also brought into the short circuit state. However, when the short circuit is detected, the series power converting unit operates to output the entire or whole voltage of the alternating-current output of the uninterruptible power supply system at the output end so that the value of the alternating-current power at the output end becomes the specified value of output. Therefore, even when an operation delay occurs, until the completion of isolation of the alternating-current power supplying side, the value of the alternating-current power at the output end is maintained at the specified value.

Moreover, by the uninterruptible power supply system according to the present invention, when power failure is detected, the alternating-current supplying side is isolated by the cutting off unit, while the parallel power converting unit is operated to make the voltage of the parallel connected point side become a supplied alternating-current power voltage detected by the alternating-current voltage detecting unit, and the series power converting unit is made to perform an operation for compensating the alternating-current output of the parallel power converting unit so as to make the value of the alternating-current output at the output end become a specified output value. Therefore, even when an operation delay occurs, until the completion of isolation of the alternating-current power supply side, the value of the alternating-current output at the output end can be maintained at the specified value. Along with this arrangement, flowing of an unexpected current in the uninterruptible power supply unit can be avoided.

When the supplied alternating-current power is sound, the series power converting unit operates for compensating the supplied alternating-current power with the electricity storing unit taken as an electric power source so that a value of an alternating-current power output at the output end becomes a specified value of output. Moreover, the parallel power converting unit carries out charging and discharging of the electricity storing unit so that an amount of stored electricity in the electricity storing unit becomes a specified amount. Therefore, when the supplied alternating-current power is sound, the value of the alternating-current power output at the output end is to be maintained at the specified value of output.

Meanwhile, when a power failure occurs on the alternating-current power supplying side and this is detected by the power failure detecting unit, the alternating-current power supplying side is isolated from the uninterruptible power supply system side by the cutting off unit. Here, during the time from occurrence of the power failure on the alternating-current power supplying side through the operation of the cutting out unit in response thereto to completion of isolation of the alternating-current power supplying side, a residual voltage of the alternating-current power is to appear on the output end side of the cutting out unit.

When the power failure is detected, the parallel power converting unit operates so that a voltage on the parallel connected point side becomes the supplied alternating-current power voltage detected by the alternating-current voltage detecting unit. Thus, no electric potential difference is produced between the alternating-current power supplying side and the parallel connected point side. Therefore, no unexpected current is to flow due to the power failure. While the series power converting unit, at the time when the power failure is detected, carries out the operation for compensating the alternating-current output of the parallel power converting unit so that the value of the alternating-current output at the output end becomes the specified value of output. Therefore, even when operation delay results until the completion of isolation of the alternating-current power supplying side, the value of the alternating-current power at the output end is maintained at the specified value. Moreover, no unexpected current is to flow in the uninterruptible power supply system.

Given the disclosure of the present invention, one versed in the art would appreciate that there may be other embodiments and modifications within the scope and spirit of the present invention. Accordingly, all modifications and equivalents attainable by one versed in the art from the present disclosure within the scope and spirit of the present invention are to be included as further embodiments of the present invention. The scope of the present invention accordingly is to be defined as set forth in the appended claims.

The disclosure of the priority application, JP 2003-095800, in its entirety, including the drawings, claims, and the specification thereof, is incorporated herein by reference.

What is claimed is:

1. An uninterruptible power supply system comprising:
   a circuit cutoff unit, inserted between an input end to which alternating-current power is supplied and an output end connectable to a load, for isolating the alternating-current power supplying side;
   a parallel power converting unit connected between the cutoff unit and the output end in parallel to the input end;
   a series power converting unit connected in series between a parallel connected point of the parallel power converting unit and the output end;
   an electricity storing unit permitting electric power to be interchanged between the parallel power converting unit and series power converting unit; and
   a power failure detecting unit that detects a power failure,
   wherein when the supply of the alternating-current power is within a normal predetermined range, the series power converting unit compensates the supply of the alternating-current power with the electricity storing unit taken as an electric power source so that a value of an alternating-current power output at the output end becomes a specified value of output, and the parallel power converting unit charges and discharges the electricity storing unit so that an amount of stored electricity in the electricity storing unit becomes a specified amount, and
   wherein when the power failure detecting unit detects a power failure, the cutoff unit isolates the alternating-current power supplying side, and the series power converting unit operates with the electricity storing unit taken as a power source so that the value of the alternating-current power at the output end becomes the specified value of output.

2. The power supply system according to claim 1, wherein when the power failure detecting unit detects a power failure, the series power converting unit outputs the whole voltage of the alternating-current output at the output end so that the value of the alternating-current power output end becomes the specified value of output.

3. The power supply system according to claim 1, wherein when the power failure detecting unit detects a power failure, the parallel power converting unit outputs a zero voltage to the output end and to a cutoff unit side connected to the output end so that no electric potential difference is produced between the input end and the output of the parallel power converting unit.

4. The power supply system according to claim 1, further including an alternating-current voltage detecting unit that detects a voltage of the supplied alternating-current power.

5. The power supply system according to claim 4, wherein when the power failure detecting unit detects a power failure, the parallel power converting unit operates so that a voltage of the parallel connected point side becomes the alternating-current power source voltage detected by the alternating-current voltage detecting unit, and the series power converting unit compensates an output voltage of the parallel power converting unit so that the value of the alternating-current output at the output end becomes the specified value of output.

6. The power supply system according to claim 1, wherein when the power failure detecting unit detects a power failure, the parallel power converting unit outputs a voltage equivalent to the input voltage of the input end to the output end and to a cutoff unit side connected to the output end so that no electric potential difference is produced between the input end and the output of the parallel power converting unit.

7. An uninterruptible power supply system comprising:
   a circuit cutoff unit, inserted between an input end to which alternating-current power is supplied and an output end connectable to a load, for isolating the alternating-current power supplying side;
   a parallel power converting unit connected between the cutoff unit and the output end in parallel to the input end;
   a series power converting unit connected in series between a parallel connected point of the parallel power converting unit and the output end;
   an electricity storing unit permitting electric power to be interchanged between the parallel power converting unit and series power converting unit; and
   a control circuit connected to the parallel power converting unit and series power converting unit, the control circuit including a power failure detecting unit that detects a power failure,
   wherein when the supply of the alternating-current power is within a normal predetermined range, the control circuit controls the series power converting unit to compensate the supply of the alternating-current power with the electricity storing unit taken as an electric power source so that a value of an alternating-current power output at the output end becomes a specified value of output, and controls the parallel power converting unit to charge and discharge the electricity storing unit so that an amount of stored electricity in the electricity storing unit becomes a specified amount,
   wherein when the power failure detecting unit detects a power failure, the control circuit controls the cutoff unit to isolate the alternating-current power supplying side, and controls the series power converting unit to operate with the electricity storing unit taken as a power source so that the value of the alternating-current power at the output end becomes the specified value of output,
   wherein the control circuit includes a control for preventing an electric potential difference produced between the input end and the output of the parallel power converting unit during a power failure.

8. The power supply system according to claim 7, wherein when the power failure detecting unit detects a power failure, the control circuit controls the series power converting unit to output the whole voltage of the alternating-current output at the output end so that the value of the alternating-current power at the output end becomes the specified value of output.

9. The power supply system according to claim 7, wherein when the power failure detecting unit detects a power failure, the control circuit controls the parallel power converting unit to output a zero voltage to the output end and to a cutoff unit side connected to the output end so that no electric potential difference is produced between the input end and the output of the parallel power converting unit.

10. The power supply system according to claim 7, further including an alternating-current voltage detecting unit that detects a voltage of the supplied alternating-current power.

11. The power supply system according to claim 10, wherein when the power failure detecting unit detects a power failure, the control circuit controls the parallel power converting unit so that a voltage of the parallel connected point side becomes the alternating-current power source voltage detected by the alternating-current voltage detecting unit, and controls the series power converting unit to compensate an output voltage of the parallel power converting unit so that the value of the alternating-current output at the output end becomes the specified value of output.

12. The power supply system according to claim 7, wherein when the power failure detecting unit detects a power failure, the control circuit controls the parallel power converting unit to output a voltage equivalent to the input voltage of the input end to the output end and to a cutoff unit side connected to the output end so that no electric potential difference is produced between the input end and the output of the parallel power converting unit.

* * * * *